June 2, 1931.  V. G. APPLE  1,807,955
DYNAMO ELECTRIC MACHINE
Original Filed June 13, 1928
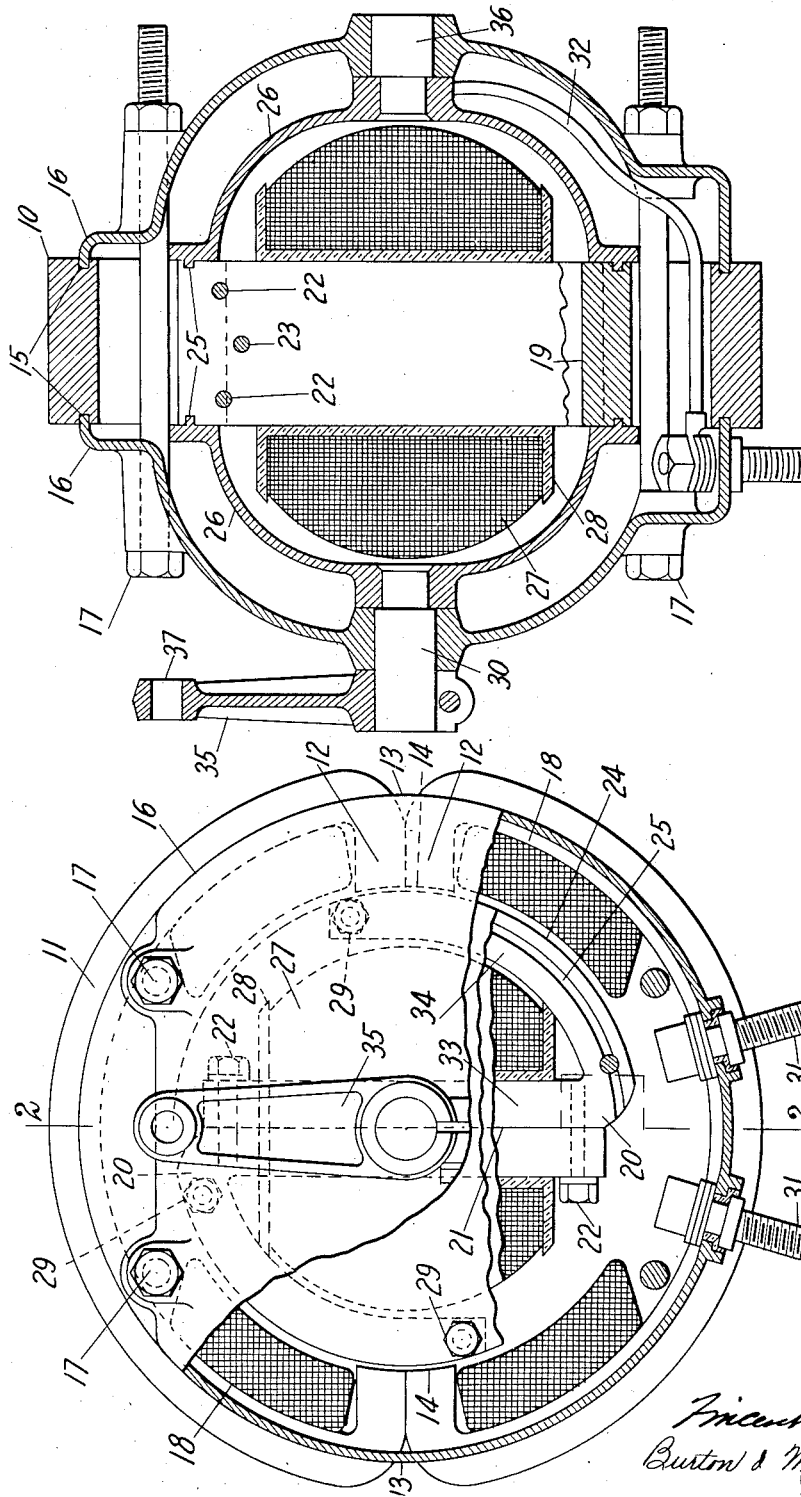
INVENTOR.
Vincent G. Apple
Burton & McConkey,
ATTORNEYS.

Patented June 2, 1931

1,807,955

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

DYNAMO ELECTRIC MACHINE

Application filed June 13, 1928, Serial No. 285,090. Renewed May 5, 1930.

My invention relates to an improved dynamo electric machine.

An object of my invention is to provide a simple, inexpensive, sturdy dynamo electric machine of light weight and maximum efficiency capable of exerting a substantially uniform torque throughout a stroke which extends for only a relatively short distance in one direction and having a spring or some similar means to turn the machine to its starting point.

One object is to provide an electric machine possessing the above characteristics which is particularly adaptable for use in operating brake mechanism such as is employed on automotive vehicles though obviously aplicable to a great variety of purposes and which is illustrated in an automobile brake hook-up in my co-pending application executed this same day and being Serial No. 285,089, filed June 13, 1928.

Another object resides in building such an electric dynamo machine out of a minimum number of easily assembled parts so shaped and assembled together as to lend themselves readily to quick construction and assembly at a minimum cost.

The above objects and others together with various advantages and meritorious features of my invention will more fully appear from the following specification, appended claims and accompanying drawings, wherein:

Fig. 1 is a view of my magnetic device shown partly in elevation and partly in vertical section.

Fig. 2 is a vertical section taken at 2—2 of Fig. 1.

The embodiment of my invention herein shown somewhat resembles an electric motor, but since it is required to operate through only part of a revolution, no commutator or brush, such as are used in a motor having a continuously rotating armature are required, the current being instead conveyed to both armature and field windings through leads connecting the coils to the binding posts.

A bipolar field core is formed by providing two substantially equal iron bars 10 of rectangular cross section, bending them to semi-circular form as at 11, with their ends turned in as at 12, welding the ends of the two bent bars together and filling in metal at 13 thereby providing an annular core member, boring the poles which have been formed, each from two ends 12, at 14, and machining annular grooves 15 in the opposite flat edges of the core structure to concentrically support the bearing heads 16.

Bolts 17 hold the bearing heads in place against the opposite edges of the core member, and suitably formed field coils 18 surround the poles to create the required magnetic flux.

The armature core is formed by providing two substantially equal pieces of bar stock 19, of rectangular cross section, bending them somewhat to V form as at 20 thus providing a straight core portion 33 and a bent horn portion 34, machining the surfaces to make a magnetic joint at 21, joining the straight side portions back to back by screws 22 and dowels 23, then turning the outer diameter 24, and forming the annular grooves 25, which concentrically locate the journal heads 26.

A coil 27 is wound on a spool 28 and the straight side portions 33 of the armature core are inserted therein, the two halves of the core being inserted into opposite ends of the spool, one-half from each end and before the screws 22 and the dowels 23 are put in.

The journal heads 26 have annular ribs corresponding to grooves 25 and are secured to the core by screws 29 with the ribs disposed within the grooves, the entire armature structure being thus adapted to oscillate on journals 30 and 36 carried by the journal heads 26 and journalled in the bearing heads 16.

By the procedure disclosed armature and field cores are provided at small expense and are of such form as may be wound with little labor, for ordinarily poles of field cores have extended horns over which the field coils will not pass, so that the poles must be bolted into the yoke.

In the structure shown the absence of field pole horns is compensated for by the long horns 34 of the armature core, which do not interfere with winding the armature because of the novel method employed to insert the armature core parts into the coil.

The leads from both field and armature windings connect to binding posts 31 as in a shunt motor, the flexible leads 32 being brought from armature coil 27 through journal head 26 as nearly as possible to its center of rotation so that the armature may oscillate through a considerable portion of a turn without greatly flexing the lead.

An arm 35 secured to an extended portion of journal 30 has a hole 37 to which suitable operating linkage may be attached.

The linkage is preferably arranged to permit the armature to oscillate but slightly over ninety degrees, in which case no great variation in pull at the end of lever 35 will be noticed.

I claim:

1. A dynamo electric machine field core comprising, two substantially equal magnetizable bars bent to semi-circular form with ends turned inwardly and welded together forming poles and having annular grooves formed in their edges to support bearing heads and bearing heads supported within the annular grooves of the core.

2. A dynamo electric machine field core comprising, an annular core structure formed of two substantially equal semi-circular magnetizable bars having inwardly turned ends secured together forming poles, coils about the poles, said core provided on opposite edges with annular grooves, bearing heads arranged on opposite sides of said core having flanges disposed within said grooves and means securing said bearing heads together on opposite sides of the core.

3. A dynamo electric machine armature core comprising, two substantially equal magnetizable bars bent into substantially V form and secured together along two sides with the V openings arranged at opposite ends of the secured sides.

4. A dynamo electric machine armature core comprising, two substantially equal magnetizable bars bent into substantially V form, having one straight side and one curved side, said straight sides being secured together back to back with the V openings oppositely disposed, the curved sides of said bars having annular grooves formed therein, and journal heads on opposite sides of said bars engaged in said grooves.

5. A dynamo electric machine armature comprising, a spool of insulated wire, two magnetizable bars bent and each having one end inserted into the spool and the opposite end extending axially along the outside of the spool, and a pair of journal heads secured to the opposite edges of the bars enclosing the spool.

6. A dynamo electric machine armature comprising, a coil, a pair of complementary angular core members straddling the opposite ends of the coil with one side of each inserted into the coil, said sides being inserted into opposite ends of the coil.

7. A dynamo electric machine armature comprising, a coil, a pair of complementary angular core members straddling the opposite ends of the coil with one side of each inserted into the coil, said sides being inserted into opposite sides of the coil and being formed and secured together to form a magnetic joint therebetween.

8. A dynamo electric machine armature core comprising, two substantially equal magnetizable bars bent into substantially V form, having one straight side and one curved side, a coil, said magnetizable bent bars arranged to straddle the opposite ends of the coil with the straight side of one bar inserted into one end of the coil and the straight side of the other bar inserted into the opposite end of the coil, said straight sides being secured together and the curved sides of the bars extending partially about the coil from opposite ends thereof.

9. A dynamo electric machine armature core comprising, two substantially equal magnetizable bars bent into substantially V form, having one straight side and one curved side, a coil, said magnetizable bent bars arranged to straddle the opposite ends of the coil with the straight side of one bar inserted into one end of the coil and the straight side of the other bar inserted into the opposite end of the coil, said straight sides being secured together and the curved sides of the bars extending partially about the coil from opposite ends thereof, and a pair of journal heads secured to the opposite edges of the curved sides of the bars enclosing said coil.

10. A dynamo electric machine armature core comprising, two substantially equal magnetizable bars bent into substantially V form, having one straight side and one curved side, a coil, said magnetizable bent bars arranged to straddle the opposite ends of the coil with the straight side of one bar inserted into one end of the coil and the straight side of the other bar inserted into the opposite end of the coil, said straight sides being secured together and the curved sides of the bars extending partially about the coil from opposite ends thereof, the curved sides of said bars having annular grooves formed in their opposite edges, and a pair of journal heads secured to the opposite edges of the curved sides of the bars and engaged in the grooves formed therein.

11. A dynamo electric machine armature core, comprising, two substantially equal magnetizable bars bent into substantially V form, having one straight side and one curved side, a coil, said magnetizable bent bars arranged to straddle the opposite ends of the coil with the straight side of one bar inserted into one end of the coil and the straight side of the other bar inserted into the opposite end of the coil, said straight sides extending entirely through the coil and secured together beyond the ends thereof.

12. A dynamo electric armature core comprising two substantially equal magnetizable bars bent into substantially V shape, a coil, said bent bars arranged to straddle the opposite ends of the coil with one side of one bar inserted into one end of the coil and the corresponding side of the other bar inserted into the opposite end of the coil and secured to the inserted side of the first bar the other side of each bar extending partially about the coil.

13. A dynamo electric armature core comprising two substantially equal magnetizable bars bent into substantially V shape, a coil, said bent bars arranged to straddle the opposite ends of the coil with one side of one bar inserted into one end of the coil and extending therethrough and the corresponding side of the other bar inserted into the opposite end of the coil and extending therethrough and secured to the inserted side of the first bar beyond the ends of the coil, the other side of each bar extending only partially axially about the coil, and a pair of journal heads secured on opposite sides of those portions of the bars which extend partially about the coil enclosing the coil.

14. A dynamo electric machine field core comprising, an annular core structure formed of two substantially equal semicircular magnetizable bars having inwardly turned ends secured together forming poles, coils about the poles, a pair of bearing heads arranged on opposite sides of said core and secured to its opposite edges.

15. A dynamo electric machine field core comprising, an annular core structure formed of two substantially equal semicircular magnetizable bars having inwardly turned ends secured together forming poles, coils about the poles, a pair of bearing heads arranged on opposite sides of said core and interengaged concentrically therewith and secured to its opposite edges.

16. A dynamo electric machine field core comprising, an annular core structure formed of two substantially equal semicircular magnetizable bars having inwardly turned ends secured together forming poles, coils about the poles, a pair of bearing heads arranged on opposite sides of said core and interengaged concentrically therewith and secured to its opposite edges. An armature core journaled within said field core comprising two substantially equal magnetizable bars bent into substantially V shape, a coil, said bars arranged to straddle the opposite ends of the coil with the side of one bar inserted into one end of the coil and the corresponding side of the other bar inserted into the opposite end of the coil, the other side of each bar extending partially about the outside of the coil.

17. A dynamo electric machine field core comprising, an annular core structure formed of two substantially equal semicircular magnetizable bars having inwardly turned ends secured together forming poles, coils about the poles, a pair of bearing heads arranged on opposite sides of said core and interengaged concentrically therewith and secured to its opposite edges. An armature core journaled within said field core comprising two substantially equal magnetizable bars bent into substantially V shape, a coil, said bars arranged to straddle the opposite ends of the coil with the side of one bar inserted into one end of the coil and the corresponding side of the other bar inserted into the opposite end of the coil, the other side of each bar extending partially about the outside of the coil, a pair of journal heads arranged upon opposite sides of said bars and secured to that portion of each bar which extends partially about the coil enclosing the coil said journal heads pivotally secured to the bearing heads journalling the armature core within the field core.

18. A field core housing comprising two concentrically journalled units each having a flange extending around the peripheral face thereof, and a pair of soft iron strap members having grooves extending along their peripheral edge uniting said units to form a single element, said flanges being received within said grooves.

19. An electro-magnet structure comprising, in combination, an outer casing, an inner casing concentrically journalled therein for rotation, field coils supported within said outer casing around said inner casing, and an armature coil supported within said inner casing.

20. An electro-magnet structure comprising, in combination, an outer casing, an inner casing concentrically journalled therein for rotation, field coils supported within said outer casing around said inner casing, and an armature coil assembly supported within said inner casing, said outer casing including a split peripheral portion having inturned flanges, a soft iron bar having marginal grooves along its peripheral edge adapted to receive said flanges, said bar being inturned at one point thereof to extend within the outer casing between the field coils supported therein.

21. In an electro-magnet structure of the character described, two complementary casing members each having a peripheral flange, an iron bar having peripheral grooves along opposite edges, said flanges being seated throughout half their circumference within said peripheral grooves, and a second similarly formed iron bar uniting in like manner the other half of the circumference of said casing.

22. In an electro-magnet structure of the character described, two complementary casing members, two complementary iron bars interposed between the opposed edges of said casing members and having inturned ends forming magnetic poles.

23. In an electro-magnet structure of the character described, two complementary casing members, two complementary soft iron bars interposed between the edges of said casing members and having inturned opposite ends, and a field coil about each pair of inturned ends of the two bars.

24. A dynamo electric machine comprising two complementary iron bars arranged end to end and having inturned end portions, a field coil arranged around each pair of ends, two complementary iron bars arranged end to end and having inturned abutting opposite end portions, and an armature coil arranged about said end portions.

25. A dynamo electric machine comprising two curved iron bars having inturned ends forming opposite poles of the field, a field core arranged about each pair of inturned ends, two curved iron bars journalled within the said field having opposite inturned ends, and an armature coil arranged about said ends.

26. A dynamo electric machine comprising an outer casing, an inner casing journalled within the outer casing, field coils positioned between the inner and outer casings, and an armature coil supported within the inner casing.

In testimony whereof I, VINCENT G. APPLE, sign this specification.

VINCENT G. APPLE.